(12) United States Patent
Palmer et al.

(10) Patent No.: US 9,264,299 B1
(45) Date of Patent: Feb. 16, 2016

(54) TRANSPARENT PSTN FAILOVER

(71) Applicant: CenturyLink Intellectual Property LLC, Denver, CO (US)

(72) Inventors: Charles A. Palmer, Overland Park, KS (US); Tod Higman, Littleton, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 120 days.

(21) Appl. No.: 13/908,644

(22) Filed: Jun. 3, 2013

Related U.S. Application Data (60) Provisional application No. 61/784,677, filed on Mar. 14, 2013.

(51) Int. Cl.
| | |
|---|---|
| *H04L 12/24* | (2006.01) |
| *H04L 12/703* | (2013.01) |
| *H04M 7/00* | (2006.01) |

(52) U.S. Cl.
CPC ............ *H04L 41/0654* (2013.01); *H04L 45/28* (2013.01); *H04M 7/0006* (2013.01)

(58) Field of Classification Search
None
See application file for complete search history.

(56) References Cited

U.S. PATENT DOCUMENTS

| | | | |
|---|---|---|---|
| 5,598,401 | A | 1/1997 | Blackwell et al. |
| 5,889,470 | A | 3/1999 | Kaycee et al. |
| 6,553,515 | B1 | 4/2003 | Gross et al. |
| 6,926,708 | B1 | 8/2005 | Franks-Farah et al. |
| 7,254,832 | B1 | 8/2007 | Christie, IV |
| 7,260,089 | B2 | 8/2007 | Lowmaster |
| 8,315,165 | B2 | 11/2012 | Eydelman et al. |
| 8,891,753 | B2 * | 11/2014 | Kirchhoff et al. ......... 379/212.01 |
| 8,976,785 | B2 | 3/2015 | Sweeney et al. |
| 9,025,438 | B1 | 5/2015 | Palmer et al. |
| 2001/0053125 | A1 | 12/2001 | Staples et al. |
| 2003/0091028 | A1 | 5/2003 | Chang et al. |
| 2003/0202462 | A1 | 10/2003 | Smith et al. |
| 2004/0032945 | A1 | 2/2004 | Huang et al. |
| 2004/0170160 | A1 | 9/2004 | Li et al. |
| 2005/0025043 | A1 | 2/2005 | Mussman et al. |
| 2005/0053051 | A1 | 3/2005 | Beyda et al. |
| 2005/0083928 | A1 | 4/2005 | Sivabalan et al. |
| 2005/0141675 | A1 | 6/2005 | Jung |
| 2005/0286711 | A1 | 12/2005 | Lee et al. |

(Continued)

OTHER PUBLICATIONS

New Horizon Communications, New Horizon Business VoIP Services, 2011, New Horizon Communications Corp., pp. 4 of 8.*

(Continued)

*Primary Examiner* — Noel Beharry
*Assistant Examiner* — Rodrick Mak
(74) *Attorney, Agent, or Firm* — Swanson & Bratschun, L.L.C.

(57) ABSTRACT

Novel tools and techniques for implementing Transparent PSTN Failover. In some embodiments, a VoIP switch might receive a call request for connection between a calling party at a calling telephone number ("TN") and a called party at a called TN. Based on a determination that connection via a session border controller ("SBC") between the VoIP switch and an Internet Protocol ("IP") gateway has been lost, the VoIP switch might route the call request to a PSTN redirect TN through the PSTN. One of the Class 5 switch of the PSTN or the IP gateway might replace the redirect TN with the called TN, based on a determination that the redirect TN represents a PSTN failover. The IP gateway may then route the call request to an IP PBX for terminating (establishing) the call connection between calling party and called party, without interception by an operator, receptionizt, or auto attendant.

16 Claims, 7 Drawing Sheets

(56) References Cited

U.S. PATENT DOCUMENTS

| | | | |
|---|---|---|---|
| 2006/0023657 | A1 | 2/2006 | Woodson et al. |
| 2006/0050682 | A1 | 3/2006 | Vance |
| 2006/0187898 | A1 | 8/2006 | Chou et al. |
| 2006/0193447 | A1 | 8/2006 | Schwartz |
| 2007/0004396 | A1 | 1/2007 | Connelly |
| 2007/0023455 | A1 | 2/2007 | Krengel et al. |
| 2007/0165611 | A1 | 7/2007 | Yang et al. |
| 2008/0159273 | A1 | 7/2008 | Brugman |
| 2008/0285485 | A1 | 11/2008 | Kingsley |
| 2008/0285544 | A1 | 11/2008 | Qiu et al. |
| 2008/0298248 | A1 | 12/2008 | Roeck et al. |
| 2009/0003318 | A1 | 1/2009 | Sweeney et al. |
| 2009/0097471 | A1 | 4/2009 | Qiu et al. |
| 2009/0161741 | A1 | 6/2009 | Ginis et al. |
| 2009/0225744 | A1 | 9/2009 | Zerillo |
| 2011/0149951 | A1* | 6/2011 | Qiu et al. .................. 370/352 |
| 2012/0155445 | A1* | 6/2012 | Javaregowda et al. ........ 370/338 |
| 2014/0047122 | A1* | 2/2014 | Haserodt et al. .............. 709/228 |
| 2014/0095922 | A1* | 4/2014 | Baker et al. .................... 714/4.2 |

OTHER PUBLICATIONS

Adtran, Total Access 900/900e Series IP Business Gateways, 2010, Adtran, Inc., pp. 1 and 4.*

U.S. Appl. No. 11/823,528; Non Final Office Action dated Feb. 14, 2012; 30 pages.

U.S. Appl. No. 11/823,528; Final Office Action dated Nov. 8, 2011; 31 pages.

U.S. Appl. No. 11/823,528; Final Rejection dated Jan. 7, 2013; 31 pages.

U.S. Appl. No. 11/823,528; Final Rejection dated Oct. 25, 2013; 31 pages.

U.S. Appl. No. 11/823,528; Non Final Office Action dated Apr. 13, 2011; 30 pages.

U.S. Appl. No. 11/823,528; Non Final Office Action dated Sep. 14, 2012; 29 pages.

U.S. Appl. No. 11/823,528; Non Final Rejection dated Jun. 3, 2013; 30 pages.

U.S. Appl. No. 12/825,507; Final Rejection dated Oct. 10, 2013; 59 pages.

U.S. Appl. No. 12/825,507; Non-Final Rejection dated Jul. 5, 2012; 33 pages.

U.S. Appl. No. 12/825,507; Non-Final Rejection dated Feb. 15, 2013; 44 pages.

U.S. Appl. No. 11/823,528; Non-Final Rejection dated Jun. 20, 2014; 38 pages.

U.S. Appl. No. 12/825,507; Non-Final Rejection dated Apr. 11, 2014; 63 pages.

U.S. Appl. No. 12/825,507; Final Rejection dated Aug. 6, 2014; 66 pages.

U.S. Appl. No. 11/823,528; Notice of Allowance dated Oct. 28, 2014; 33 pages.

U.S. Appl. No. 12/825,507; Issue Notification dated Apr. 15, 2015; 1 page.

U.S. Appl. No. 12/825,507; Notice of Allowance dated Dec. 19, 2014; 48 pages.

U.S. Appl. No. 11/823,528; Issue Notification dated Feb. 18, 2015; 1 page.

* cited by examiner

TRANSPARENT PSTN FAILOVER

CROSS-REFERENCES TO RELATED APPLICATIONS

This application claims priority to U.S. Patent Application Ser. No. 61/784,677 (the "'677 application"), filed Mar. 14, 2013 by Charles A. Palmer et al., entitled, "Transparent PSTN Failover," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a method and a system for implementing Failover from a VoIP system, and, more particularly, to a method and a system for implementing Transparent PSTN Failover.

BACKGROUND

In the U.S., the public switched telephone network ("PSTN") was built when incumbent local exchange carriers ("ILECs") were in a monopoly environment. The ILECs had 100% market share and any network construction was built into the rate base. Cost was not a factor, but quality and reliability were the drivers. This is why the United States has the most reliable public telephone network in the world, and people take it for granted. The PSTN has set the expectation bar for Voice over Internet Protocol ("VoIP"). However, in the era of deregulation, data networks were built in a competitive environment and network costs directly impacted customer pricing, so cost became the driver of network construction. Data networks are not as bullet proof as the PSTN. People assume that the new VoIP technology will have the same reliability as the PSTN. VoIP voice, however, is just another data application going over a data network. It does not matter if the carrier is AT&T, CenturyLink, Verizon, or anyone else; data networks do not have the gold plated redundancy of the PSTN. As such, currently implemented PSTN failover platforms cannot protect a customer from 100% of the entire spectrum of outage possibilities that can occur.

A commonly used VoIP switch in the market today is the Broadsoft platform (specifically known as "Broadworks"). The Broadsoft platform has a standard PSTN failover capability that some service providers have turned on and some have not. When the connectivity between the Network session border controller ("SBC") and the customer's private branch exchange ("PBX") is lost, the Broadsoft platform will direct inbound calls to 'Failover' by call forwarding to a single PSTN number. However, these calls must be answered (i.e., intercepted) by an operator, a receptionist, or an Auto Attendant to request the information needed to correctly terminate the call to the intended party. While an improvement over no failover capability at all, this feature is suboptimal for customers (i.e., the called party or callee) and for the calling party or caller.

This limited PSTN Failover feature, as described above and commonly referred to as "Broadsoft Trunk Group Unavailable," is currently available as a standard offering of the Broadsoft VoIP switch. However, this is an unsatisfactory customer solution. The Broadsoft switch fails all calls over (i.e., performs Call Forwarding) to be delivered to a single PSTN telephone number. The calls have to be 'intercepted' by an operator, a receptionist, or an Auto Attendant to obtain the phone number that was originally dialed by the caller (i.e., the "CALLED #"). For large customers, this limited failover feature may be inadequate because the number of failover calls may overwhelm these customers, and these customers may not be staffed to deal with answering every call and the Auto Attendant programming can be difficult.

Redundant VoIP switches, dual SBCs, or alternate access circuits, and the like might merely address specific instances of potential outages, but do not provide the functionality achievable by the various embodiments described herein.

The embodiments disclosed herein are directed toward overcoming one or more of the problems discussed above.

BRIEF SUMMARY

Various embodiments provide techniques to provide or implement transparent failover. In particular, a VoIP switch (including, but not limited to, a Broadsoft VoIP switch or the like) might receive a call request for a call connection over VoIP between a calling party at a calling number and a called party at a called number. When it is determined that a connection between a network session border controller ("SBC") and a premises-based SBC and/or an IP gateway, the VoIP switch might route the call connection to a redirect number that might be a PSTN number associated with one or more of the called number, the called party, a customer associated with the called number, and/or the premises at which the called telephone is located. The call request might thus be routed through a PSTN, via a voice gateway that might convert the call request from a VoIP format to time division multiplex ("TDM") format.

Either a Class 5 switch at the PSTN or the IP gateway might determine that the redirect number is associated with a PSTN failover, and based on such determination, might replace the redirect number with the original called number in the call request. The IP gateway might then route the call request to the original called party at the original called number via an IP PBX that might terminate (i.e., establish) the call connection between the calling party and the called party, without interception by an operator, a receptionist, or an auto attendant. In so doing, the transparent PSTN failover may be implemented, with none of the calling party, the called party, or the IP PBX being aware that a failover has occurred.

In one aspect, a method may be provided for implementing transparent PSTN failover. The method might comprise receiving, with a Voice over Internet Protocol ("VoIP") switch, a first Session Initiation Protocol ("SIP") invite from an originating telephone at a calling telephone number ("TN"). The calling TN might be associated with a calling party. The first SIP invite might be for establishing a call connection between the calling party and a called party at a called TN of a destination telephone at a customer premises. The method might further comprise determining, with the VoIP switch, whether communication via a session border controller ("SBC") between the VoIP switch and an Internet Protocol private branch exchange ("IP PBX") associated with the called TN has been lost, prior to establishing the call connection. The method might comprise sending, with the VoIP switch, a second SIP invite to a voice gateway, based on a redirect TN associated with the customer premises, based on a determination that communication between the VoIP switch and the IP PBX has been lost.

The method might further comprise sending, with the voice gateway, call information that is associated with the redirect TN to a Class 5 switch of a public switched telephone network ("PSTN"), and sending, with the Class 5 switch of the PSTN, the call information to an IP gateway over a primary rate interface ("PRI"). The call information sent to the IP gateway over a data channel of the PRI might comprise the calling TN, the called TN, and the redirect TN. The method might also comprise receiving, with the IP gateway, the call information, and determining, with the IP gateway, whether the call information indicates that the inbound call from the PSTN is a failover call, based on a determination that the redirect TN is associated with a PSTN failover. Based on a determination that the inbound call is a failover call, the IP gateway might replace the redirect TN with the called TN in a header of a third SIP invite associated with the redirect TN, to generate a fourth SIP invite associated with the called TN.

The method might additionally comprise sending, with the IP gateway, the fourth SIP invite to the IP PBX, and establishing, with the IP PBX, the call connection between the originating telephone at the calling TN and the destination telephone at the called TN, without interception by an operator, a receptionist, or an auto attendant.

In another aspect, a method might be provided for implementing transparent PSTN Failover. The method might comprise routing, with a Voice over Internet Protocol ("VoIP") switch, a first call request for a first call connection between a calling party at a calling telephone number ("TN") and a called party at a called TN at a customer premises, as a second call request for a second call connection between the calling TN and a redirect TN associated with the customer premises, through a public switched telephone network ("PSTN"). Such routing might be performed, based on a determination that communication via a session border controller ("SBC") between the VoIP switch and an Internet Protocol private branch exchange ("IP PBX") associated with the called TN has been lost.

The method might further comprise routing, with a Class 5 switch of the PSTN, the second call request to an Internet Protocol ("IP") gateway via a primary rate interface ("PRI"), and based on a determination that the redirect TN is associated with a PSTN failover, replacing, in the second call request, the redirect TN with the called TN. The method might also comprise routing, with the IP gateway, the second call request to the IP PBX for establishing the first call connection between the calling party at the calling TN and the called party at the called TN.

In yet another aspect, a system might be provided for implementing transparent PSTN Failover. The system might comprise a Voice over Internet Protocol ("VoIP") switch, a Class 5 switch of a public switched telephone network ("PSTN"), and an Internet Protocol ("IP") gateway. The VoIP switch might be configured to route a first call request for a first call connection between a calling party at a calling telephone number ("TN") and a called party at a called TN at a customer premises, as a second call request for a second call connection between the calling TN and a redirect TN associated with the customer premises, through the PSTN, based on a determination that communication via a session border controller ("SBC") between the VoIP switch and an Internet Protocol private branch exchange ("IP PBX") associated with the called TN has been lost. The Class 5 switch might be configured to route the second call request to the IP gateway via a primary rate interface ("PRI"). The IP gateway might be configured to route the second call request to the IP PBX for establishing the first call connection between the calling party at the calling TN and the called party at the called TN. One of the Class 5 switch or the IP gateway might be further configured to replace, in the second call request, the redirect TN with the called TN, based on a determination that the redirect TN is associated with a PSTN failover.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide techniques for implementing transparent failover. In some embodiments, these techniques may be applied to a number of different Voice over Internet Protocol ("VoIP") switches, including without limitation switches made by Broadsoft, which is currently the largest VoIP switch platform manufacturer in the market. According to some embodiments, 'Transparent Failover' might mean that the Failover capability in the alternate delivery of telephone calls over a different transport platform is totally 'transparent' to the customer's private branch exchange ("PBX"). The PBX might terminate the calls to the destination telephone stations business as usual ("BAU"). According to some embodiments, the public switched telephone network ("PSTN") might operate BAU with an Internet Protocol ("IP") gateway (e.g., a Cisco Unified Border Element ("CUBE") or an Adtran IP Gateway) implementing the methods described herein, while in other embodiments, the Class 5 switch might perform the methods described herein with the IP gateway operating BAU. In some cases, the 'Transparent' element might be externally added to the basic Broadsoft PSTN failover feature to deliver the original 'CALLED' number to the customer's PBX, instead of the failover Call Forward Number or 'REDIRECT' number.

During an outage where the VoIP switch loses connectivity with the customer's IP PBX (e.g., due to network outage, customer premises equipment ("CPE") failure, fiber cut, or the like), the various embodiments might cause the VoIP switch to failover to the PSTN and be delivered to the customer's destination PBX and onto the original destination telephone. In other words, in the event of an inability to deliver VoIP voice traffic to a customer's phone system over the primary data access circuit, a back-up delivery platform, being the traditional PSTN, may be provided. This technology and network infrastructure is not affected by issues impacting data networks, which are generally much more prone to outages than the traditional PSTN. In particular, with various embodiments, the failover calls may be automatically presented to the customer's PBX with the original dialed number so the PBX can terminate the calls as normal without the calls being 'Intercepted' (e.g., by an operator, a receptionist, or an auto attendant, or the like). In other words, the standard feature may be enhanced by the various embodiments by externally adding the CALLED number via a CPE at the customer premise to deliver calls to be transparently terminated by the customer's IP PBX. In some cases, external addition of the CALLED number may be performed by the Class 5 switch of the PSTN.

The "transparent" PSTN failover is an enhancement over the Broadsoft standard PSTN failover feature. The calls might be delivered via the PSTN directly to the customer's PBX to terminate, without the calls needing to be intercepted (e.g., by an operator, a receptionist, or an auto attendant, or the like). Neither the caller nor the customer (or called party) will know there has been an outage. The only indication that an outage has occurred might be that calls in progress at the time of the outage event will be dropped. Inbound calls made after the outage, may be automatically rerouted to and may be delivered by the PSTN to the customer's IP PBX via a PRI, defined as a 'Failover PRI,' to be terminated as normal to the destination station. When the outage is cleared, the inbound and outbound calls might automatically revert to the primary VoIP access circuit. The PSTN calls in progress might continue until the voice conversation is completed by the callers. Inbound and outbound failover calls may be delivered to a customer IP PBX located in a rate center of a service provider. Failover calls might be delivered to on-net customer locations to the VoIP telephone numbers ("TNs") over a customer's wide area network ("WAN") to on-net locations (e.g., a customer's private data network, or the like) on the WAN. For example, if a company has multiple facilities in various cities, and these locations are linked to the customer's WAN (i.e., are on-net), a failover from VoIP may cover all of these locations so that calls may continue to be received and made to and from all the locations.

The VoIP Failover to PSTN techniques and systems described herein mitigate a great majority of data network outages, and at a cost to the customer that is minimal.

Herein, the term "business continuity" ("BC") might refer to the ability for a customer to continue to operate its voice services when an outage occurs with employees in their primary work environment. The term "disaster recovery" ("DR") might refer to the ability for a customer to continue to operate its voice services when an event occurs where the employees are not able to be in their primary work environment. These situations might include, without limitation, flood, fire, building evacuations of some sort, or the like. Employees might then work offsite to send and receive voice calls. The VoIP platform, according to various embodiments, may be capable of providing BC and DR for various service provider voice services and platforms.

A voice gateway, as understood by those skilled in the art, is a device that translates time division multiplex ("TDM")-based call requests, which are used in the PSTN, into VoIP-based call requests, and vice versa. For the purposes of this disclosure, however, "voice gateway" might be used herein to refer to conversion from VoIP-based call requests to TDM-based call requests, while "IP gateway" might be used herein to refer to conversion from TDM-based call requests to VoIP-based call requests.

A session border controller ("SBC") is a VoIP piece of equipment or device that is designed for, and devoted to, working on a VoIP traffic stream both for the input side and the output side of VoIP sessions. The function of an SBC is to normalize or translate VoIP to VoIP communications between different manufacturers of VoIP equipment to translate and tweak (or modify) the VoIP SIP signaling between vendors. Each vendor has latitude to customize SIP features to make their products unique, the downside of this is that a Brand X signal cannot be understood or acted on by Brand Y. The SBC acts as an interpreter to normalize the VoIP traffic on both sides of the SBC so the different brands of equipment can correctly communicate. An SBC may be capable of header manipulation that are based on header manipulation rules ("HMR") well known to those skilled in the art.

As is well understood in the art, the term, "termination of a call" or similar phrasing (e.g., "terminating a call," etc.), means connecting or establishing a call between a caller and a recipient. Herein also, "CPE" might refer to "customer premises equipment" or "customer provided equipment," which might be any terminal and/or associated equipment located as a subscriber's or customer's premises that might be connected with a carrier's telecommunication channel. CPEs generally refer to devices including, but not limited to, telephones, routers, switches, residential gateways ("RGs"), set-top boxes, fixed mobile convergence products, home networking adaptors, Internet access gateways, and the like that enable consumers to access service providers' services and to distribute the services around the subscriber's or customer's premises via a local area network ("LAN") or other appropriate network. As also understood in the art, a VoIP message might comprise a header and a payload.

The basic premise of Transparent Failover is that the alternate transport platform to deliver the Failover Calls might be a Primary Rate Interface ("PRI"), which is a PSTN access circuit, to the customer premises. The data channel (or "D channel") in the PRI contains all the call information details and specifically contains three telephone numbers: (1) the From # (i.e., the "CALLING #"); (2) the To # (i.e., the originally dialed number or "CALLED #"); and (3) the Call Forward # (i.e., the "REDIRECT #"). A call that has been "call forwarded" is the number that is presented to the receiving phone system. Most Call Forward calls are transferred to a 3rd party to answer. In this situation, the calls might be delivered to the original customer PBX via the PSTN. As such, it may be desired to present to the customer's PBX, the originally dialed number (CALLED #) to the PBX so the PBX can terminate the call "transparently" to the intended party. This requires replacing the REDIRECT # (which is in the field that the PBX goes to or looks up, to obtain the terminating number) with the originally dialed CALLED #.

In some embodiments, VoIP header manipulation to overwrite the CALLED # into the field that is presented to the PBX may make this termination "transparent" and "business as usual" to the customer's PBX. Neither the caller, the customer, nor the PBX might know the call has failed over and is being delivered via the Failover PRI path. The capabilities of a premises-based Session Border Controller ("SBC") or IP gateway that has a PRI interface in a unique configuration of PSTN and VoIP technologies may be used to achieve this feature. There are two actions in the premises-based SBC or IP gateway: (1) the TDM PRI call might be converted to VoIP packets; and (2) the header of the VoIP packet might be manipulated to replace the REDIRECT # in the PBX "presentation field" with the CALLED # obtained by the SBC from a non-VoIP technology platform (e.g., the 'D' channel of a PRI, or the like).

In a specific example, the PRI port of an IP gateway (e.g., Cisco CUBE or Adtran IP gateway, or the like) might be set to a USER setting, which might default to the following actions: (1) The Called Party information element (e.g., dialed number identification service ("DNIS") or direct inward dialing ("DID")) might be copied to the user portion of the session initiation protocol ("SIP") uniform resource identifier ("URI") and the user portion of the "To" header, where the Calling Party information element (e.g., automatic number identification ("ANI") or Caller-ID) might be copied to the user portion of the SIP "From" header; (2) The Redirecting Number ("RN") information element might be copied to a user portion of a URI in a SIP Diversion header; and (3) It would likely be ignored by the PBX. However, if it is a problem for the PBX, there may be a configuration option on some VoIP trunks (e.g., 908e VoIP trunk) to the PBX called "no diversion-supported" that might disable the insertion of the SIP Diversion header when a Redirect # is received.

Without the use of the various embodiments, the PRI Failover circuit might have calls being forwarded to a customer IP PBX that are not part of the customer SIP Trunk group. Therefore, the PBX cannot terminate the call, and the call must be 'intercepted' (e.g., by an operator, a receptionist, or an auto attendant, etc.) to obtain the terminating number from the party originating the call. By using a premises-based SBC or an IP gateway (e.g., a Cisco Unified Border Element ("CUBE"), or the like), SIP header manipulation can be performed on the incoming PRI to change the forwarded called number to the original called number.

In light of the fact that an SBC is a VoIP to VoIP networking device that is not designed to be a TDM to VoIP device, the various embodiments combine the unique technology capabilities of a voice or IP gateway (which might provide PRI to VoIP capabilities) and an SBC to achieve a Transparent Failover feature, as described in detail herein. The VoIP packet is presented to the PBX as a normal VoIP phone call.

In other words, in various embodiments, the technology capabilities inherent in traditional time-division multiplexing ("TDM") telephony (i.e., Primary Rate Interface ("PRI") circuits) and the SBC VoIP Header Manipulation Rules (HMR) technology may be intermixed to create a unique capability using a TDM circuit (PRI) phone call on one side and a VoIP call on the other side of the SBC—namely, TDM to/from VoIP (rather than standard VoIP to VoIP functionality in standard SBC utilization). This unique capability delivers the originally dialed phone number (CALLED # carried in the TDM PRI D Channel) of a Call Forwarded inbound call to be placed into the phone call's VoIP header by the SBC located on the customer premise, so that the customer PBX can terminate the call to the station associated with the originally dialed (i.e., CALLED #) telephone number. These calls might be completely transparent to the customer's IP PBX and may operate "business as usual" ("BAU") with no additional PBX configuration changes to handle these calls. The above-mentioned feature is not limited to a specific brand, model, or vendor of SBCs, but may cover the category of using any SBC to provide such capability.

Three general types of failover are described below: (1) Transparent PSTN Failover; (2) Transparent Internet Failover; and (3) Session Initiation Protocol ("SIP") Trunking Failover PRIs on VoIP Platforms Utilizing False Numbers.

Transparent PSTN Failover

Two components may be required for Transparent PSTN Failover. First, a Failover PRI may be designated as such. In some embodiments, the Failover PRI might be an existing PRI that is designated as the Failover PRI. In other embodiments, the Failover PRI might be a PRI that is newly installed. For the Failover PRI, one spare customer number might be assigned to remain as a PSTN number on the failover PRI ("FO PRI") and might also be loaded into the VoIP switch as the failover TN. Second, as in all Session Initiation Protocol ("SIP") Trunking opportunities, a premises-based SBC or an IP gateway might be required. The SBC or IP gateway might have one or more PRI ports to accept the Failover PRI(s). In some examples, a Cisco™ CUBE with a Multiflex WAN card might be suitable for this transparent failover. Other commercial systems might include Adtran 900e series gateways (including, for example, Adtran 908e IP gateway, Adtran 924e IP gateway, or the like).

FIGS. 1-6 illustrate some of the features of the method and system for implementing Transparent PSTN Failover as referred to above. The methods and systems illustrated by FIGS. 1-6 refer to examples of different embodiments that include various components and steps, which can be considered alternatives or which can be used in conjunction with one another in the various embodiments. In each of the methods and systems illustrated by FIGS. 1-6, not all of the components or steps shown therein are required for implementing Transparent Failover. The description of the illustrated methods and systems shown in FIGS. 1-6 is provided for purposes of illustration and should not be considered to limit the scope of the different embodiments.

Figure 1:
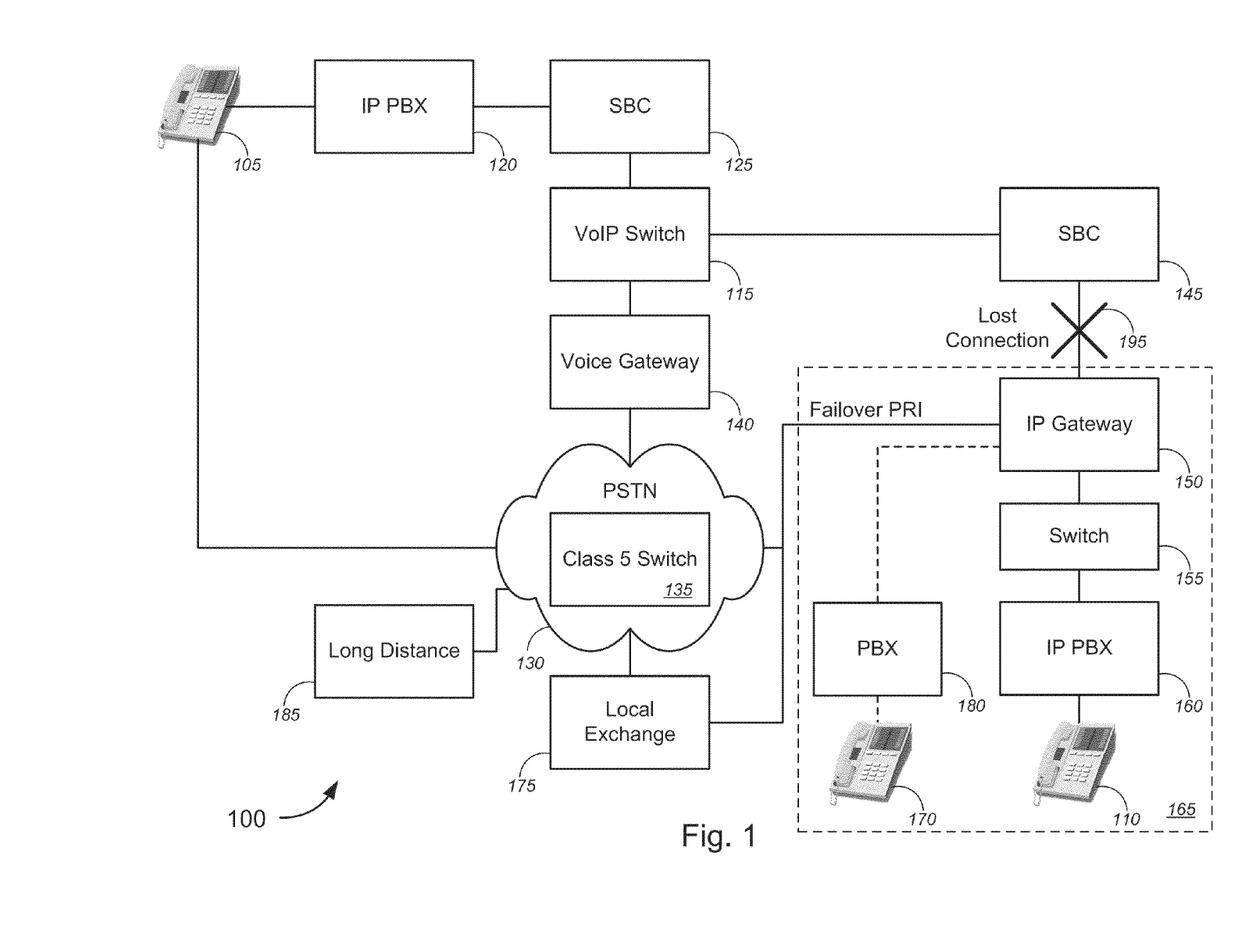
FIG. 1 is a general schematic system diagram illustrating an exemplary communications network for implementing Transparent PSTN Failover, in accordance with various embodiments.

FIG. 1 is a general schematic system diagram illustrating an exemplary communications network 100 for implementing Transparent PSTN Failover, in accordance with various embodiments. In FIG. 1, system 100 might comprise an originating telephone 105 having a calling telephone number ("TN") that might initiate a call request for a call connection with a destination telephone 110 at a called TN (also referred to in the art as the "Call Ed" number). In the case that the originating telephone 105 is a VoIP telephone, the call request might be routed (e.g., as a SIP invite) through a VoIP switch 115 (e.g., a Broadsoft VoIP switch, any suitable switch, or the like), via an originating IP PBX 120 and an originating SBC 125. In the case that the originating telephone 105 is a TDM-based or PSTN-type telephone, the call request might be routed (e.g., as a TDM-based call request) through the PSTN 130, in particular, through a Class 5 switch 135 of the PSTN 130, and through a voice gateway 140 (e.g., a Sonus voice gateway, or the like), which might convert the TDM-based call request into a VoIP-based call request (e.g., a SIP invite), prior to sending the (VoIP-based) call request to the VoIP switch 115 for call handling.

Figure 2:
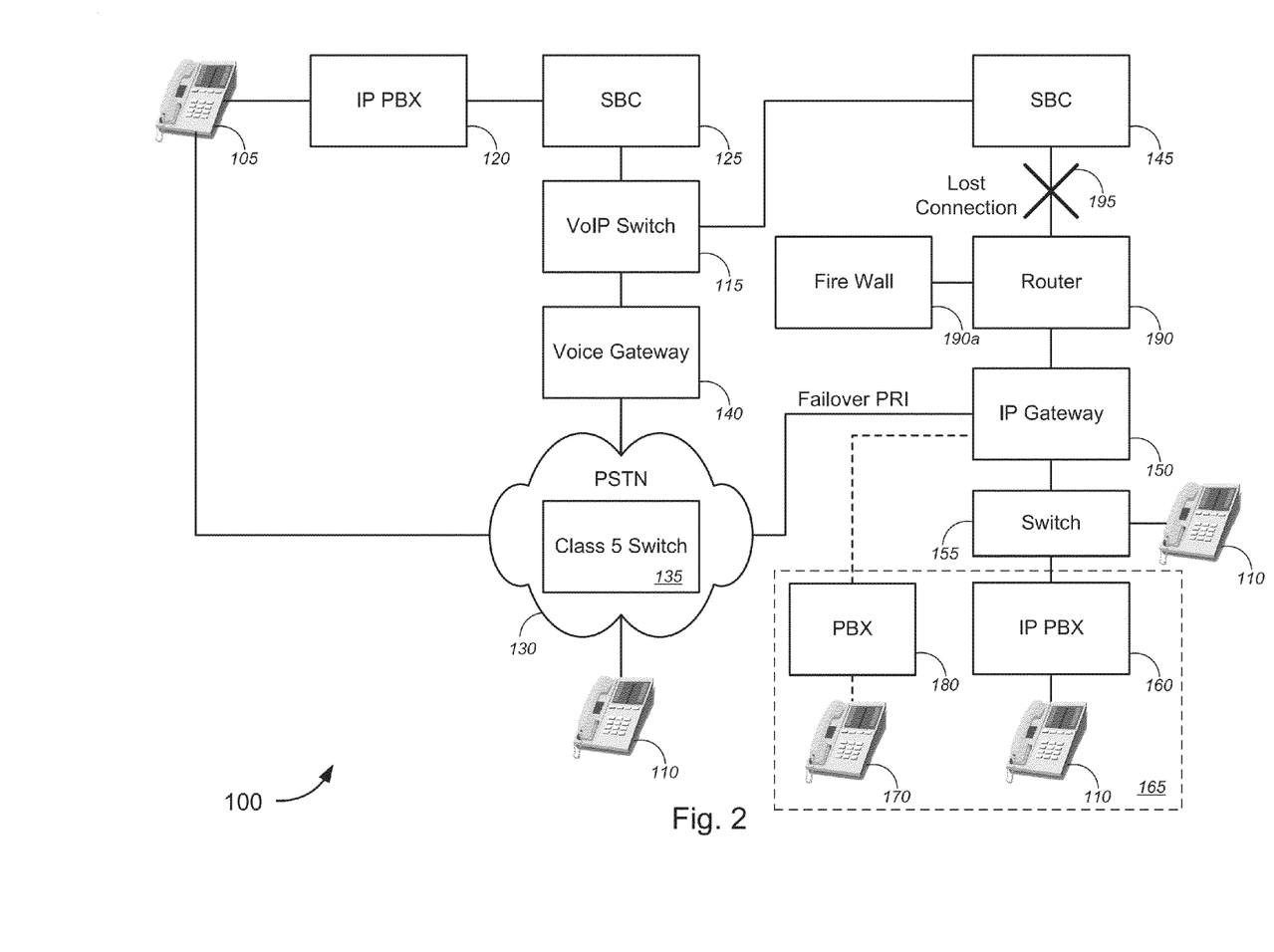
FIG. 2 is a general schematic system diagram illustrating another exemplary communications network for implementing Transparent PSTN Failover, in accordance with various embodiments.

In normal operation, the VoIP switch 115 might send the SIP invite (i.e., VoIP-based call request) to the network session border controller ("SBC") 145, which might then relay the SIP invite to an IP gateway 150 (e.g., Cisco CUBE with Multiflex WAN Card, an Adtran 908e/924e IP gateway with SBC, or the like). The IP gateway 150 might route the SIP invite to a switch 155, which might in turn route the SIP invite to an Internet Protocol ("IP") Private Branch Exchange ("PBX") 160. The IP PBX 160, upon receiving the SIP invite, might establish (or terminate) a call connection between the originating telephone 105 at the calling TN with the destination telephone 110 at the called TN. According to some embodiments, the IP gateway 150, the switch 155, the IP PBX 160, and the destination telephone 110 might all be located at the customer premises 165. In other embodiments, the IP gateway 150, the switch 155, or both might be located outside the customer premises (e.g., as shown in FIG. 2). In any event, the IP gateway 150 might at least in part be associated with one or more of the customer premises 165, the owner of the customer premises 165, the destination telephone 110, or the called party associated with the destination telephone 110 or with the called TN.

In the case that connection is lost between the SBC 145 and the IP gateway 150 (e.g., due to a fiber cut, network outage, CPE failure, or the like; as indicated in FIG. 1 as lost connection 195) during a call, the call might be dropped. If the connection is lost prior to the call request being sent to the IP gateway 150, the VoIP switch 115, in some cases, might determine whether connection has been lost between the VoIP switch 115 and the IP gateway 150 via the SBC 145. In some instances, such determination might be made by attempting, but failing, to send the SIP invite from the SBC 145 to the IP Gateway 150 a predetermined number of times (e.g., 1, 2, or 3 times, or the like), or after a predetermined time period (e.g., 50 ms, 100 ms, 0.5 s, 1 s, or any period between 20 ms to 10 s, or the like). In other instances, such determination might be made by periodically sending pings from the VoIP switch 115 to the IP gateway 150 via SBC 145, and subsequently receiving notification of failed attempts to do so. In yet other instances, communications between the SBC 145 (and/or VoIP switch 115) and IP gateway 150 might be monitored, such that a break in the communications for at least a preset period (e.g., 50 ms, 100 ms, 0.5 s, 1 s, or any period between 20 ms to 10 s, or the like) might trigger a notification to the VoIP switch 115 that communication has been lost.

Based on a determination that communication between the VoIP switch 115 and the IP gateway 150 via SBC 145 has been lost, the VoIP switch 115 might modify the call request to replace the called TN with a redirect TN of a redirect telephone 170. The redirect TN might be a PSTN number that may be associated with one or more of the customer premises 165, the owner of the customer premises 165, the destination telephone 110, or the called party associated with the destination telephone 110 or with the called TN. The VoIP switch 115 might then send the modified call request (with the redirect TN) to the voice gateway 140, which might convert the VoIP-based call request (e.g., SIP invite) into a TDM-based call request. In some embodiments, the CPE or data network outage might cause a Trunk Group ("TG") Unavailable feature of the VoIP switch to be invoked, which might cause failover to the PSTN number (i.e., the redirect TN). The voice gateway 140 might then send the TDM-based call request to the Class 5 switch 135 of the PSTN 130 for routing to the PSTN-based redirect TN associated with one or more of the customer premises 165, the destination telephone 110, or the called party associated with the destination telephone 110 or with the called TN.

In some instances, the Class 5 switch 135 might route the TDM-based call request to a local exchange 175, which might in turn route the call request to a primary rate interface ("PRI") port of the IP gateway 150. In other cases, the Class 5 switch 135 might route the TDM-based call request directly to the PRI port of the IP gateway 150 over a failover PRI (i.e., by bypassing the local exchange 175). According to some embodiments, the IP gateway 150 might be a combination voice gateway and SBC (e.g., Cisco CUBE with Multiflex WAN Card, an Adtran 908e/924e IP gateway with SBC, or the like), which might convert the TDM-based call request from the Class 5 switch 135 into a VoIP-based call request (e.g., SIP invite), and might translate the resultant VoIP-based call request into a VoIP format compatible with the IP PBX 160.

In some embodiments, prior to routing the call request to the IP gateway 150, the Class 5 switch 135 might determine that the redirect TN is associated with a PSTN failover (e.g., the customer might initially have assigned the redirect TN as a failover PSTN number, or the like). Accordingly, the Class 5 switch 135 might retrieve the called TN in the call request and might replace the redirect TN with the original called TN associated with the destination telephone 110, thus reverting the modified call request to the original call request. The Class 5 switch 135 might then send the reverted call request to the PRI port of the IP gateway 150 over the failover PRI, either through the local exchange 175 or by by-passing the local exchange 175.

In other embodiments, the call request received by the IP gateway 150 from the Class 5 switch 135 might be the modified call request (with the redirect TN). The IP gateway 150, in these embodiments, might determine that the redirect TN is associated with a PSTN failover (e.g., the customer might initially have assigned the redirect TN as a failover PSTN number). As such, the IP gateway 150 might look to the data channel (i.e., "D channel") of the PRI, which might contain call information including, but not limited to, the calling TN, the redirect TN, and the called TN. Retrieving the called TN from the D channel of the PRI, the IP gateway 150 might replace the redirect TN with the original called TN associated with the destination telephone 110. In some instances, replacing the redirect TN with the called TN might include utilizing header manipulation techniques and/or following header manipulation rules ("HMR") to manipulate the header of the VoIP-based call request (i.e., SIP invite) to replace the redirect TN with the called TN. For example, some IP gateways (e.g., Adtran 908e or Cisco 29XX, or the like) might have HMR capability to present the called TN to the customer's IP PBX via Ethernet VoIP, instead of the redirect TN. In so doing, the modified call request may be reverted to the original call request to the original called TN at the destination telephone 110.

The IP gateway 150 might then route the reverted or original call request to the destination telephone 110 at the called TN to the IP PBX 160. In some cases, routing of the call request from the IP gateway 150 to the IP PBX 160 might include routing via a switch 155. In other cases, switch 155 (if any) might be by-passed. The IP PBX 160 might then establish the call connection between the originating telephone 105 at the calling TN with the destination telephone 110 at the original called TN.

By failing over in this manner, the need for routing the call by an operator, a receptionist, or an auto attendant at the customer premises 165—who might become involved, e.g., in the case that the redirect TN is not replaced with the called TN, and the call is routed through PBX 180 to redirect telephone 170—might be obviated. Thus, time and cost savings by the customer might be achieved. Moreover, to the calling party at the calling TN and the called party at the called TN, the call connection may be perceived as being normal or business as usual ("BAU"). In other words, the calling party and the called party might not realize that a failover has occurred, because neither party need encounter any operator, receptionist, or auto attendant.

For an outgoing call from telephone 110, the VoIP-based call request might be routed through the IP PBX 160, through switch 155 (if any), to the IP gateway 150. If the IP gateway 150 determines the connection is lost between the IP gateway 150 and the network SBC 145, or otherwise is unable to connect with network SBC 145, the IP gateway 150 might convert the VoIP-based call request into a TDM-based call request and send the TDM-based call request to the Class 5 switch 135, via the PRI port of the IP gateway 150 (over the failover PRI) and via local exchange 175 (if any). The Class 5 switch 135 might then determine whether the call request is for a local call or a long distance call. For a local call, the Class 5 switch 135 might route the call request to local exchange 175. For a long distance call, the Class 5 switch 135 might route the call request to a long distance call destination 185 (which might be associated with, e.g., a long distance block of time plan or an "LD BOT" Plan, or the like).

FIGS. 2-5 represent alternative embodiments of the exemplary communications network 100 of FIG. 1. The various components of the communications networks shown in FIGS. 1-5 may be interchanged with each other, added to other communications networks shown in the other figures, or removed from the communications networks, without changing the scope of the various embodiments.

For example, FIG. 2 is a general schematic system diagram illustrating another exemplary communications network 100 for implementing Transparent PSTN Failover, in accordance with various embodiments. In FIG. 2, originating telephone 105, originating IP PBX 120, originating SBC 125, VoIP switch 115, voice gateway 140, PSTN 130, Class 5 switch 135, network SBC 145, IP gateway 150, switch 155, IP PBX 160, PBX 180, redirect telephone 170, and lost connection 195 might be similar in terms of hardware and functionality as the corresponding communications network component as shown in FIG. 1 and as described above.

In the embodiment as shown in FIG. 2, communications network 100 might further comprise a router 190 in communication with network SBC 145 and IP gateway 150, and a fire wall 190a associated with router 190. Lost connection 195 (e.g., due to network outage, CPE failure, fiber cut, or the like) might occur between network SBC 145 and router 190.

Destination telephone 110 might be directly in communication with IP PBX 160, similar to the case as shown in FIG. 1. Alternatively, destination telephone 110 might be in communication with IP PBX 160 via switch 155. In some cases, destination telephone 110 (either in connection with switch 155, or directly with IP PBX 160) might be located within customer premises 165. In other cases, destination telephone 110 might be located outside customer premises 165. Although FIG. 2 shows router 190, fire wall 190a, IP gateway 150, and switch 155 being located outside customer premises 165, in some instances, router 190, fire wall 190a, IP gateway 150, and switch 155 might be located within customer premises 165.

According to some embodiments, destination telephone 110 might be connected directly with PSTN 130 or connected with PSTN 130 via local exchange 175, without a connection with IP gateway 150.

The Transparent PSTN Failover process of FIG. 2 might otherwise be similar to, if not identical, to the Transparent PSTN Failover process as described above with respect to FIG. 1.

Figure 3:
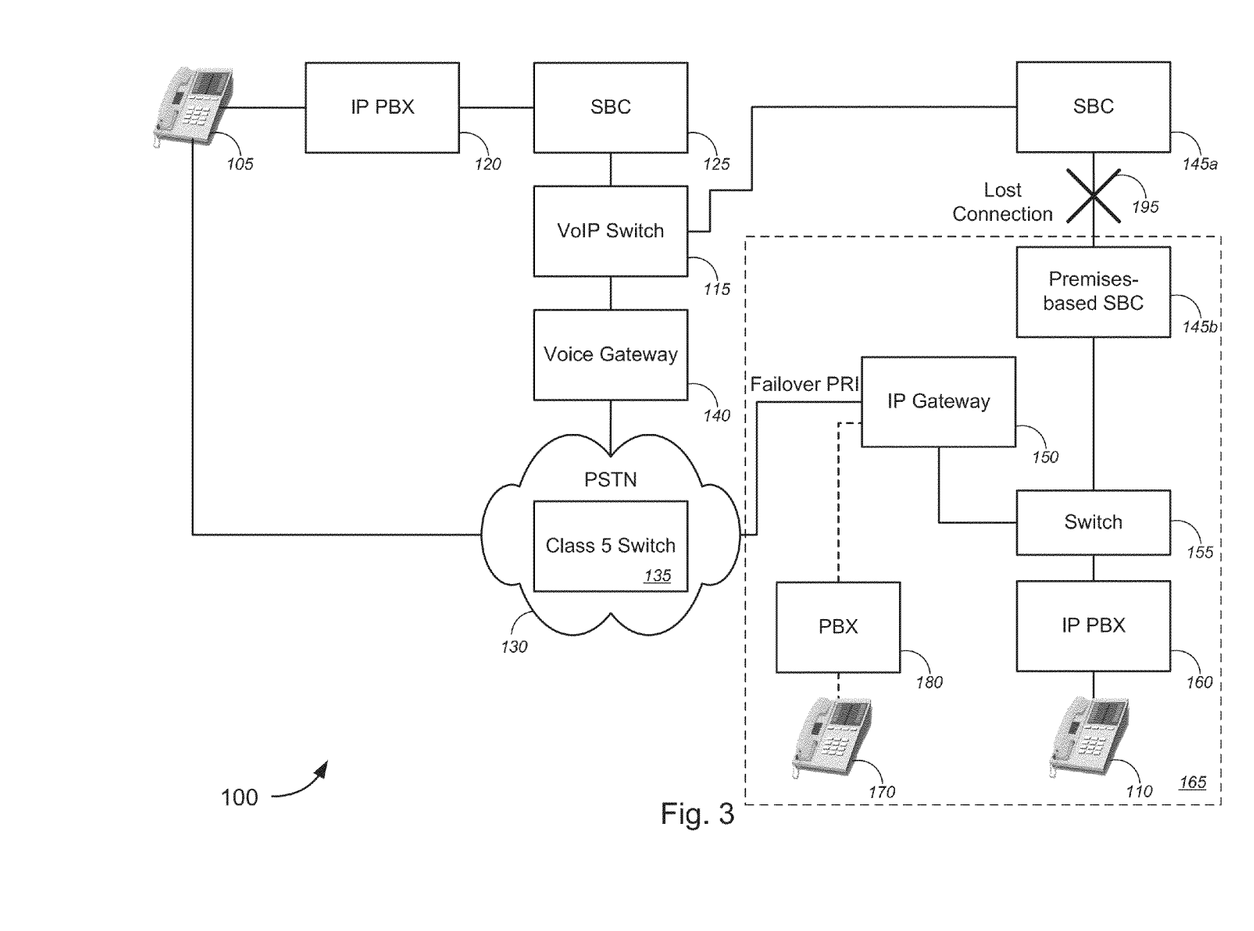
FIG. 3 is a general schematic system diagram illustrating yet another exemplary communications network for implementing Transparent PSTN Failover, in accordance with various embodiments.

FIG. 3 is a general schematic system diagram illustrating yet another exemplary communications network 100 for implementing Transparent PSTN Failover, in accordance with various embodiments. In FIG. 3, originating telephone 105, originating IP PBX 120, originating SBC 125, VoIP switch 115, voice gateway 140, PSTN 130, Class 5 switch 135, IP gateway 150, switch 155, IP PBX 160, PBX 180, destination telephone 110, redirect telephone 170, and lost connection 195 might be similar in terms of hardware and functionality as the corresponding communications network component as shown in FIG. 1 and as described above.

In the embodiment of FIG. 3, communications network 100 might further comprise a network SBC 145a and a premises-based SBC 145b, each of which might be similar in terms of hardware and functionality as network SBC 145 as shown in, and described above with respect to, FIG. 1. As the name suggests, the network SBC 145a might be located at the service provider network, while the premises-based SBC 145b might be located at the customer premises 165.

In normal operation, the VoIP switch 115 might route the SIP invite (i.e., VoIP-based call request for call connection between originating telephone 105 at calling TN and destination telephone 110 at called TN) to switch 155 and IP PBX 160 via the network SBC 145a and premises-based SBC 145b, without connecting through IP gateway 150 (which might have an in-built SBC). Lost connection 195 might occur between network SBC 145a and premises-based SBC 145b.

Based on a determination that a lost connection 195 exists between network SBC 145a and premises-based SBC 145b, the VoIP switch 115 might route the call request to voice gateway 140, based on a redirect TN associated with one or more of the customer premises 165, the owner of the customer premises 165, the destination telephone 110, or the called party associated with the destination telephone 110 or with the called TN. Voice gateway 140 might convert the call request into TDM format, and might route the converted call request to Class 5 switch 135 of PSTN 130, which in turn might route the call request over the Failover PRI to IP Gateway 150. One of Class 5 switch 135 or IP Gateway 150 might replace the redirect TN in the call request with the original called TN. The IP gateway 150 might route the call request (with the original called TN) through switch 155 (if any) to IP PBX 160, which might establish (or terminate) the call connection between the originating telephone 105 at the calling TN and the destination telephone at the original called TN.

The Transparent PSTN Failover process of FIG. 3 might otherwise be similar to, if not identical, to the Transparent PSTN Failover process as described above with respect to FIG. 1.

Figure 4:
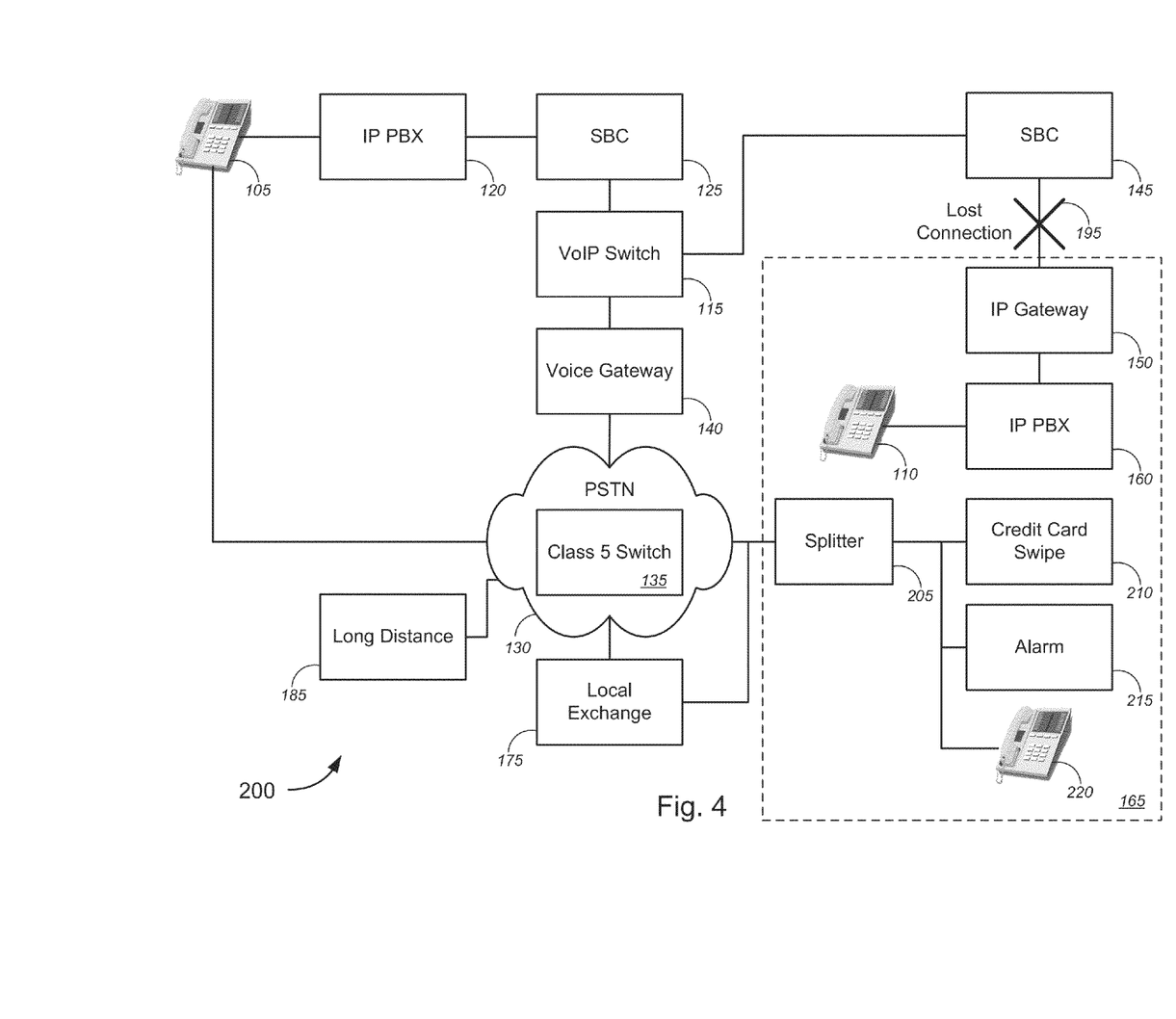
FIG. 4 is a general schematic system diagram illustrating an exemplary communications network for implementing Transparent PSTN Failover over a customer's analog B1 line, in accordance with various embodiments.

FIG. 4 is a general schematic system diagram illustrating an exemplary communications network 200 for implementing Transparent PSTN Failover over a customer's analog B1 line, in accordance with various embodiments. In FIG. 4, originating telephone 105, originating IP PBX 120, originating SBC 125, VoIP switch 115, voice gateway 140, PSTN 130, Class 5 switch 135, network SBC 145, IP gateway 150, IP PBX 160, destination telephone 110, local exchange 175, long distance call destination 185, and lost connection 195 might be similar in terms of hardware and functionality as the corresponding component in communications network 100 as shown in FIG. 1 and as described above.

In FIG. 4, communications network 200 might further comprise a splitter 205, one or more credit card swipe machines 210, one or more alarms 215, and analog destination telephone 220. In normal operation, the communications network 200 might otherwise operate in a similar manner as communications network 100 as described above with respect to FIGS. 1-3.

During failover, however, communications network 200 might failover to PSTN 130 and might continue to failover to the customers analog B1 line (if the customer has one), in which case, the analog or PSTN/TDM-based call request might be received by splitter 205 to be routed to analog destination telephone 220. Splitter 205 might otherwise relay any incoming/outgoing signals amongst credit card swipe machine(s) 210, alarm(s) 215, and analog destination telephone 220, as appropriate.

Figure 5:
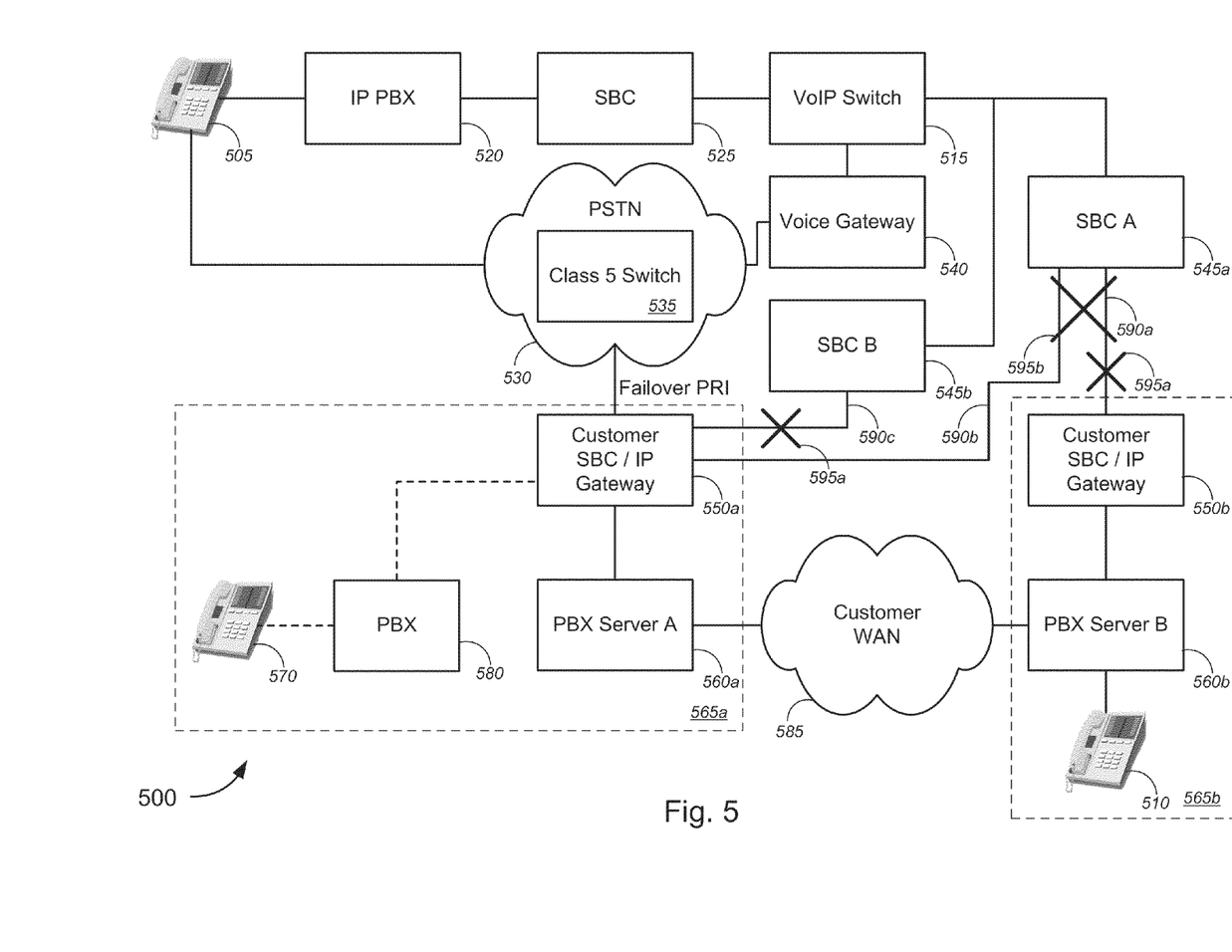
FIG. 5 is a general schematic system diagram illustrating an exemplary communications network for implementing Transparent PSTN Failover over a Failover PRI to one of a plurality of customer SBCs or IP gateways that are geographically diverse, in accordance with various embodiments.

FIG. 5 is a general schematic system diagram illustrating an exemplary communications network 500 for implementing Transparent PSTN Failover over a Failover PRI to one of a plurality of customer SBCs or IP gateways that are geographically diverse, in accordance with various embodiments. In FIG. 5, originating telephone 505, originating IP PBX 520, originating SBC 525, VoIP switch 515, voice gateway 540, PSTN 530, Class 5 switch 535, PBX 580, redirect telephone 570, and destination telephone 510 might be similar in terms of hardware and functionality as the corresponding components in communications network 100 (i.e., originating telephone 105, originating IP PBX 120, originating SBC 125, VoIP switch 115, voice gateway 140, PSTN 130, Class 5 switch 135, PBX 180, redirect telephone 170, and destination telephone 110, respectively) as shown in FIG. 1 and as described above.

Communications network 500 might further comprise one or more network SBCs 545 (including SBC A 545a and SBC B 545b), two or more customer SBCs/IP gateways 550 (including IP gateways 550a and 550b), two or more PBX servers 560 (including PBX Server A 560a and PBX Server B 560b), and a customer wide area network ("WAN") 585. Each network SBC 545, each customer SBC/IP gateway 550, and each PBX server 560 might be similar in terms of hardware and functionality as network SBC 145, customer SBC 145b and/or IP gateway 150, and IP PBX 160, respectively as shown in, and as described above with respect to, FIGS. 1-3.

FIG. 5 represents a case where a customer of the service provider might have more than one customer location 565 (i.e., locations 565a and 565b) that might be geographically diverse (e.g., in different parts of a town or city, in different cities in the same state, in different states, or the like). The PBX Servers 560a and 560b are configured to be mirrored (i.e., to be exact copies of each other, with the same connection lists to all telephones and TNs associated with each), and are designed to communicate with each other over the customer WAN 585. Without the Transparent Failover as described above with respect to FIGS. 1-3, the use of mirrored PBX Servers 560 (i.e., PBX Server A 560a and PBX Server B)—which might be linked with corresponding customer SBC/IP gateway 550 (i.e., gateways 550a and 550b), which in turn might be in communication with one or more network SBCs 545 over both a primary access path 590a and one or more alternate access paths 590b, 590c—is intended to account for a localized outage (e.g., lost connection 595a). For example, local hospital networks might have a main hospital at location 565a and a clinic at location 565b at some distance away from the main hospital (e.g., 50 miles apart). If a localized outage (e.g., lost connection 595a) occurs between the one or more network SBCs 545 and location 565b, the alternate access path 590b is intended to connect the one or more network SBCs 545 to the destination telephone at location 565b via Customer SBC/IP Gateway 550a and PBX Server A at location 565a, via customer WAN 585, and via PBX Server B 560b at location 565b. This configuration might also be applicable to 911 centers, call centers, defense/military, or the like. This approach requires that the customer purchase two access circuits and the corresponding components for the access circuits.

This approach, however, might be ineffective in the face of local or regional "data storms" that might cause not only local outages 595a, but also regional outages 595b, such that at least one connection or all connections between the one or more network SBCs 545 and the two or more customer SBC/IP gateways 550 become lost. In such cases, the Transparent PSTN Failover as described above with respect to FIGS. 1-3 might provide the desired additional redundancy initially intended by the mirrored PBX approach.

In particular, with respect to the embodiment of FIG. 5, if VoIP switch 515 determines that one or more local outages 595a and/or a regional outage 595b has occurred, such that at least one VoIP connection or all VoIP connections to the gateways 550 have been severed, VoIP switch 515 might route the call request from originating telephone 505 to voice gateway 540, for routing to a redirect TN associated with redirect telephone 570, and associated with one or more of the customer premises 565a, customer premises 565b, the owner of the customer premises 565a or 565b, the destination telephone 510, or the called party associated with the destination telephone 510 or with the called TN. The voice gateway 540 might convert the VoIP-based call request into a TDM-based call request, and might relay the converted call request to the Class 5 switch 535 of PSTN 530. The Class 5 switch 535 might route the call request to IP gateway 550a (specifically to a PRI port thereof) over a failover PRI. One of the Class 5 switch 535 or the IP Gateway 550a might replace the redirect TN with the original called TN associated with the destination telephone 510 at location 565b, based on a determination that the redirect TN represents a PSTN failover. The IP Gateway 550a might convert the call request into a VoIP-based call request for a call connection with destination telephone 510, and might send the call request to PBX Server B 560b at location 565b via PBX Server A 560a and customer WAN 585. The PBX Server B 560b might subsequently terminate (or establish) the call connection between telephones 505 and 510.

In the manner described above, calls might be delivered automatically and might transparently terminate at customer PBX 560b over completely separate PSTN transport platforms. In all situations described above with respect to local outage 595a, regional outage 595b, and the automatic and transparent termination of the calls, bidirectional inbound and outbound calling may be maintained. Automatic failover and restoration might occur in both directions. Outbound 1+ and toll free ("TF") calls might have separate TDM LD plans, not VoIP plans.

The Transparent PSTN Failover process of FIG. 5 might otherwise be similar to, if not identical, to the Transparent PSTN Failover process as described above with respect to FIG. 1.

Figure 6:
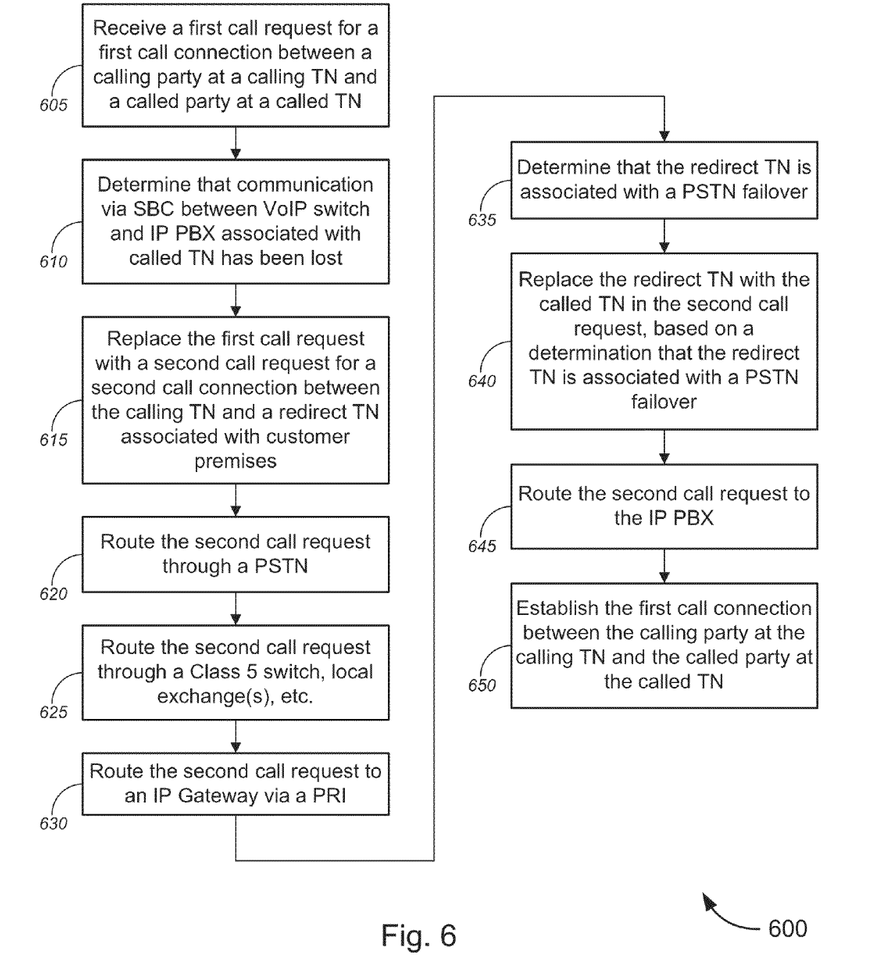
FIG. 6 is a flow diagram illustrating an exemplary method for implementing Transparent PSTN Failover, in accordance with various embodiments.

FIG. 6 is a flow diagram illustrating an exemplary method 600 for implementing Transparent PSTN Failover, in accordance with various embodiments. In FIG. 6, a VoIP switch (e.g., VoIP switch 115 or 515) might receive, at block 605, a first call request for a first call connection between a calling party at a calling TN (as represented, e.g., by originating telephone 105 or 505) and a called party at a called TN (as represented, e.g., by destination telephone 110 or 510). At block 610, the VoIP switch might determine that communication via the network SBC (e.g., network SBC 145 or 545) between the VoIP switch and an IP PBX associated with the called TN (e.g., IP PBX 160 or PBX Server B 560b) has been lost. Such determination might be made, e.g., by receiving a predetermined number of failed attempts at connecting with the IP gateway (e.g., IP gateway 150, premises-based SBC 145b, one or more customer SBC/IP gateways 550, or the like), by failing to connect with the IP gateway for over a certain time period, by failing to transmit periodically sent pings, by observing a break in monitored communications for at least a preset period, and/or the like, as described above with respect to FIG. 1.

Based on a determination that communication has been lost between the VoIP switch and the IP gateway, the VoIP switch might replace the first call request with a second call request for a second call connection between the calling TN and a redirect TN associated with one or more of the customer premises, the owner of the customer premises, the destination telephone, or the called party associated with the destination telephone or with the called TN (block 615). At block 620, the VoIP switch might route the second call request through a PSTN (e.g., PSTN 130 or 530). In particular, the second call request might be routed, at block 625, through one or more of a Class 5 switch (e.g., Class 5 switch 135 or 535), one or more local exchanges (e.g., local exchange 175), or the like. At block 630, the second call request might be routed (e.g., by the Class 5 switch or other network components) to an IP gateway via a PRI.

It may be determined at block 635 (by one of the Class 5 switch or the IP gateway) that the redirect TN is associated with a PSTN failover. For example, the customer might have previously assigned the redirect TN as a failover number that is PSTN based. Based on such a determination, the subject one of the Class 5 switch or the IP gateway might replace the redirect TN with the original called TN in the second call request (block 640), in the respective manner as described above with respect to FIG. 1. At block 645, the IP gateway might route the second call request to the IP PBX, which might, at block 650, establish the first call connection between the calling party at the calling TN and the called party at the called TN.

Transparent Internet Failover

Figure 7:
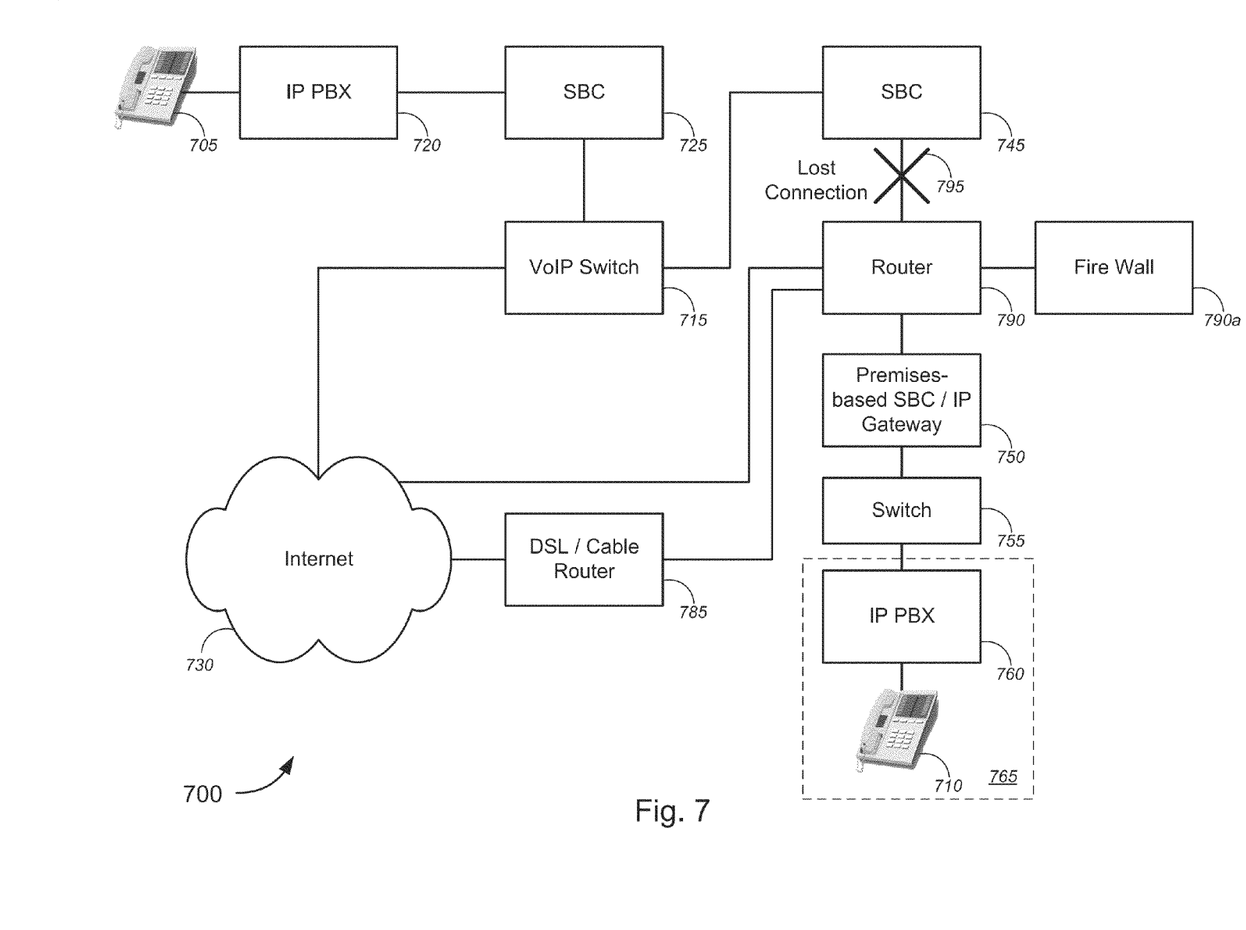
FIG. 7 is a general schematic system diagram illustrating an exemplary communications network for implementing Transparent Failover using the Internet, in accordance with various embodiments.

FIG. 7 is a general schematic system diagram illustrating an exemplary communications network 700 for implementing Transparent Failover using the Internet, in accordance with various embodiments. In FIG. 7, system 700 might comprise originating telephone 705 having a calling TN that might send a first call request to VoIP switch 715 via originating IP PBX 720 and originating SBC 725, for a call connection with destination telephone 710 having a called TN.

In normal operation, the VoIP switch 715 might send the first call request to network SBC 745, which might send the call request to IP PBX 760 through router 790 having fire wall 790a, premises-based SBC/IP gateway 750, and switch 755. The IP PBX 760 might then terminate (or establish) the call with destination telephone 710.

When connection is lost (or determined by VoIP switch 715 to be lost) between network SBC 745 and router 790 (as indicated by lost connection 795), VoIP switch 715 might relay the call request to router 790 via Internet 730, and in some cases, also via a service provider's digital subscriber line ("DSL")/Cable router 785. The call request might then be routed by router 790 to IP PBX 760 via premises-based SBC/IP gateway 750 and via switch 755 (if any). The IP PBX 760 might then establish the call connection between the originating telephone 705 at the calling TN and the destination telephone 710 at the called TN.

SIP Trunking Failover PRIs on VoIP Platforms Utilizing False Numbers

Various goals for SIP Trunking Failover PRIs on VoIP platforms might include: (a) using a single local loop as the failover ("FO") PRI for both inbound and outbound calls to the PRI ports on a customer's IP PBX; (b) using existing TDM transport network infrastructure between the Data point of presence ("POP") and the local market PSTN so that no additional changes are required; and (c) inbound and outbound FO calls that can be correctly routed through the local PSTN to enable use of common transport infrastructure. These goals are similar to the goals for Transparent PSTN Failover that utilize an IP gateway or premises-based SBC for replacing the Redirect # with the original Called #, as described above with respect to FIGS. 1-3, 5, and 6.

In some cases, additional goals might include: (d) VoIP switch alternate # failover being used with bogus (or false) NPA-NXXs to achieve a unique PSTN number to route a call back to PSTN; (e) local Class 5 switches being loaded with the bogus (or false) NPA-NXXs to identify and route these calls; and (f) the customer's SBC using bogus # (or false #) to identify the trunk group (FO PRI) and converting the bogus # (or false #) back to the original dialed number so the FO service may be completely transparent to the customer's PBX.

In the case that the VoIP platform is owned by a competitive local exchange carrier ("CLEC"), the customer direct inward dialings ("DIDs") have to be ported to the VoIP softswitch (e.g., a BS softswitch or the like). The inventors have validated that the Class 5 switch might be loaded with non-North American Dialing Plan (i.e., bogus or false) NPA-NXXs.

When an inbound call comes in, the Class 5 switch might look at the translations table to see if it recognizes the number and might switch the call to the correct port, which might be the PRI trunk associated with the customer. When an inbound call comes into the VoIP softswitch (e.g., Broadsoft platform or the like) and the data path is not available, the alternate (failover) number that is loaded might be a 7 or 10 digit number with a bogus or false NXX (or NPA-NXX) and the same last 4 digits as the PSTN DID.

An example might include an inbound call where the SIP connection (or "heartbeat") is down, and therefore the primary data path being the data network is not able to establish a call set up with the customer's IP PBX. The customer IP PBX might have PRI interfaces. In this example, an inbound call to 702-244-2999 might be dialed and the signaling for the call set up might go to the VoIP switch. An event might occur so that the call cannot be set up over the primary path across the customer's Ethernet access circuit. The VoIP switch might have an alternate 7 digit local number loaded, which might be 001-2999. The VoIP switch might send the call to the alternate number, 001-2999, to the Class 5 switch that serves the 244-2999 number. The Class 5 switch might have the 001 NXX listed in the translation table (or some other numbering scheme with 5 to 10 digits). The Class 5 switch might determine that the port associated with 001-2999 is the PRI going to ABC company. The Class 5 switch might manipulate the dialed digits, translating the number back to 244-2999 and might send the call over the PRI to the customer's PRI port on the IP PBX.

For the Failover utilizing false (or bogus) numbers, the following assumptions have been made: (i) Bogus NPA-NXX or NXX have been loaded into local PSTN Class 5 switches; and (ii) Alternate customer phone # (or route) with bogus NPA-NXX has been loaded into the VoIP switch when primary path is not available. Alternate paths from a primary path utilizing the VoIP switch might utilize the bogus NPA-NXX with the last 4 digits of the original destination number remaining the same.

Where the primary path is not available, the inbound call might failover to the alternate bogus or false number. The call might be sent to local PSTN Tandem/Class 5 switch, which might identify the terminating trunk as an FO PRI, and might translate the bogus or false number to the original dialed number (i.e., original called number). The Customer's IP PBX might send the FO calls to the VoIP station, with the service being transparent to the customer PBX. In other words, the customer PBX might remain unaware that FO has occurred.

For outbound calls, the same FO PRI might be used. In such cases, the customer PBX might failover to the FO PRI for outbound calls. The outbound calls might have a regular VoIP number and might be sent as TDM switched access long distance ("LD") calls, which might incur switched access rate plan costs.

This is a fully functional failover to the PSTN that is completely transparent to the customer's IP PBX. This service might desirably be provided over a single PRI for both inbound and outbound calling, since the inbound calls go to the customer's Class 5 switch. The local PRI loops, which might otherwise be dead assets when a customer migrates to SIP Trunking (where the customer has no use for TDM PRIs, except as described herein), might be reused.

The Intermachine trunks ("IMTs") (and bandwidth demand or B/W demand) between the PSTN and the VoIP softswitch (e.g., Broadsoft platform or the like) exist today, so no new construction is required. The bogus NXX is confined to the local PSTN and would never be dialed by an outside party. The customer may not even know it exists. These bogus NXXs might be available to and confined to each local PSTN market so that they could be used over and over again in each market. In such cases, the carrier might never run out of private failover alternate numbers to use.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for implementing transparent PSTN Failover, comprising:

receiving, with a Voice over Internet Protocol ("VoIP") switch, a first Session Initiation Protocol ("SIP") invite from an originating telephone at a calling telephone number ("TN") associated with a calling party for establishing a call connection between the calling party and a called party at a called TN of a destination telephone at a customer premises;

determining, with the VoIP switch, whether communication via a session border controller ("SBC") between the VoIP switch and an Internet Protocol private branch exchange ("IP PBX") associated with the called TN has been lost, prior to establishing the call connection;

based on a determination that communication between the VoIP switch and the IP PBX has been lost, sending, with the VoIP switch, a second SIP invite to a voice gateway, based on a redirect TN associated with the customer premises;

sending, with the voice gateway, call information that is associated with the redirect TN to a Class 5 switch of a public switched telephone network ("PSTN");

sending, with the Class 5 switch of the PSTN, the call information to an IP gateway over a primary rate interface ("PRI"), wherein the call information sent to the IP gateway over a data channel of the PRI comprises the calling TN, the called TN, and the redirect TN;

receiving, with the IP gateway, the call information;

determining, with the IP gateway, whether the call information indicates that the inbound call from the PSTN is a failover call, based on a determination that the redirect TN is associated with a PSTN failover;

based on a determination that the inbound call is a failover call, replacing, with the IP gateway, the redirect TN with the called TN in a header of a third SIP invite associated with the redirect TN, to generate a fourth SIP invite associated with the called TN;

sending, with the IP gateway, the fourth SIP invite to the IP PBX;

establishing, with the IP PBX, the call connection between the originating telephone at the calling TN and the destination telephone at the called TN, without interception by an operator, a receptionist, or an auto attendant.

2. The method of claim 1, further comprising:

converting, with the voice gateway, the first SIP invite into a time division multiplex ("TDM")-based call request, and wherein the call information sent to the Class 5 switch and received by the IP gateway comprises the TDM-based call request; and converting, with the IP gateway, the TDM-based call request into the third SIP invite.

3. The method of claim 1, wherein replacing the redirect TN with the called TN comprises replacing, with the Class 5 switch, the redirect TN with the called TN, prior to routing the call information to the IP gateway via the PRI.

4. The method of claim 1, wherein replacing the redirect TN with the called TN comprises replacing, with the IP gateway, the redirect TN with the called TN, by manipulating a header of the call information to replace the redirect TN with the called TN.

5. The method of claim 4, wherein replacing the redirect TN with the called TN further comprises, based on the determination that the redirect TN is associated with a PSTN failover, accessing a data channel of the PRI, which comprises the calling TN, the called TN, and the redirect TN, and retrieving the called TN from the data channel of the PRI for replacing the redirect TN in the call information.

6. The method of claim 1, wherein the redirect TN comprises an unused PSTN TN associated with the customer premises.

7. The method of claim 1, wherein the IP gateway comprises a SBC.

8. The method of claim 1, wherein the IP gateway comprises two or more customer IP gateways that are geographically diverse, wherein the IP PBX comprises two or more customer IP PBXs associated with the customer premises that are geographically diverse, each of the two or more customer IP PBXs being in communication with a corresponding one of the two or more customer IP gateways, and wherein the two or more customer IP PBXs are mirrored PBX servers operatively coupled to each other via a customer wide area network ("WAN").

9. The method of claim 8, wherein routing the call information through the PSTN, based on a determination that the communication between the VoIP switch and the IP PBX has been lost comprises routing the call information through the PSTN, based on a determination that the communication between the VoIP switch and the IP PBX has been lost due to local loss of connectivity impacting a primary access path between the VoIP switch and one of the two or more customer IP gateways, or due to regional loss of connectivity impacting the primary access path and one or more alternate access paths between the VoIP switch and each of the two or more customer IP gateways.

10. A system for implementing transparent PSTN Failover, comprising:

a Voice over Internet Protocol ("VoIP") switch configured to:

receive a first Session Initiation Protocol ("SIP") invite from an originating telephone at a calling telephone number ("TN") associated with a calling party for establishing a call connection between the calling party and a called party at a called TN of a destination telephone at a customer premises;

determine whether communication via a session border controller ("SBC") between the VoIP switch and an Internet Protocol private branch exchange ("IP PBX") associated with the called TN has been lost, prior to establishing the call connection;

based on a determination that communication between the VoIP switch and the IP PBX has been lost, send a second SIP invite to a voice gateway, based on a redirect TN associated with the customer premises;

the voice gateway configured to:

send call information that is associated with the redirect TN to a Class 5 switch of a public switched telephone network ("PSTN");

the Class 5 switch of the PSTN configured to:

send the call information to an IP gateway over a primary rate interface ("PRI"), wherein the call information sent to the IP gateway over a data channel of the PRI comprises the calling TN, the called TN, and the redirect TN;

the IP gateway configured to:

receive the call information;

determine whether the call information indicates that the inbound call from the PSTN is a failover call, based on a determination that the redirect TN is associated with a PSTN failover;

based on a determination that the inbound call is a failover call, replace the redirect TN with the called TN in a header of a third SIP invite associated with the redirect TN, to generate a fourth SIP invite associated with the called TN; and send the fourth SIP invite to the IP PBX; and the IP PBX configured to:

establish the call connection between the originating telephone at the calling TN and the destination telephone at the called TN, without interception by an operator, a receptionist, or an auto attendant.

11. The system of claim 10, wherein:

the voice gateway is further configured to:

convert the first SIP invite into a time division multiplex ("TDM")-based call request, and send the TDM-based call request to the Class 5 switch, wherein the call information sent to the Class 5 switch and received by the IP gateway comprises the TDM-based call request; and the IP gateway is further configured to:

convert the TDM-based call request into the third SIP invite.

12. The system of claim 10, wherein the IP gateway being configured to replace the redirect TN with the called TN in the call information comprises the IP gateway being configured to:

access a data channel of the PRI, which comprises the calling TN, the called TN, and the redirect TN;

retrieve the called TN from the data channel of the PRI; and replace the redirect TN with the called TN, by manipulating a header of the call information to replace the redirect TN with the called TN.

13. The system of claim 10, wherein the redirect TN comprises an unused PSTN TN associated with the customer premises.

14. The system of claim 10, wherein the IP gateway comprises a SBC.

15. The system of claim 10, wherein the IP gateway comprises two or more customer IP gateways that are geographically diverse, wherein the IP PBX comprises two or more customer IP PBXs associated with the customer premises that are geographically diverse, each of the two or more customer IP PBXs being in communication with a corresponding one of the two or more customer IP gateways, and wherein the two or more customer IP PBXs are mirrored PBX servers operatively coupled to each other via a customer wide area network ("WAN").

16. The system of claim 15, wherein the communication between the VoIP switch and the IP PBX being lost comprises the communication between the VoIP switch and the IP PBX being lost due to local loss of connectivity impacting a primary access path between the VoIP switch and one of the two or more customer IP gateways, or due to regional loss of connectivity impacting the primary access path and one or more alternate access paths between the VoIP switch and each of the two or more customer IP gateways.

* * * * *